US010380244B2

(12) United States Patent
Lee et al.

(10) Patent No.: US 10,380,244 B2
(45) Date of Patent: Aug. 13, 2019

(54) SERVER AND METHOD FOR PROVIDING CONTENT BASED ON CONTEXT INFORMATION

(71) Applicant: Korea University Research and Business Foundation, Seoul (KR)

(72) Inventors: Sang Keun Lee, Gangnam-Gu (KR); Woo Jong Ryu, Seongbuk-Gu (KR)

(73) Assignee: Korea University Research and Business Foundation, Seoul (KR)

( * ) Notice: Subject to any disclaimer, the term of this patent is extended or adjusted under 35 U.S.C. 154(b) by 0 days.

(21) Appl. No.: 15/866,029

(22) Filed: Jan. 9, 2018

(65) Prior Publication Data

US 2018/0196794 A1    Jul. 12, 2018

(30) Foreign Application Priority Data

Jan. 9, 2017  (KR) .................. 10-2017-0003097

(51) Int. Cl.

| G06F 17/27 | (2006.01) |
| G06F 17/10 | (2006.01) |
| G06K 9/62 | (2006.01) |
| G06F 16/31 | (2019.01) |

(52) U.S. Cl.
CPC .......... *G06F 17/274* (2013.01); *G06F 16/313* (2019.01); *G06F 17/10* (2013.01); *G06F 17/2765* (2013.01); *G06K 9/6267* (2013.01)

(58) Field of Classification Search
None
See application file for complete search history.

(56) References Cited

U.S. PATENT DOCUMENTS

| 2011/0301941 A1* | 12/2011 | De Vocht ............ G06F 17/2715 704/9 |
| 2012/0066234 A1* | 3/2012 | Lee .................... G06F 17/30867 707/749 |
| 2014/0136323 A1* | 5/2014 | Zhang ............... G06F 17/30483 705/14.53 |

\* cited by examiner

*Primary Examiner* — Antim G Shah
(74) *Attorney, Agent, or Firm* — Fox Rothschild LLP

(57) ABSTRACT

The present disclosure includes a memory in which a content providing program is stored, and a processor that executes the program stored in the memory. Herein, upon execution of the program, the processor extracts a subject and a verb property including multiple verbs corresponding to the subject from a target content, infers a verb-form subject of the target content on the basis of the subject and the verb property, and extracts one or more contents matched with the target content from among multiple candidate contents on the basis of the verb-form subject of the target content. Further, the multiple verbs corresponding to the subject are extracted from an associative verb group.

12 Claims, 7 Drawing Sheets

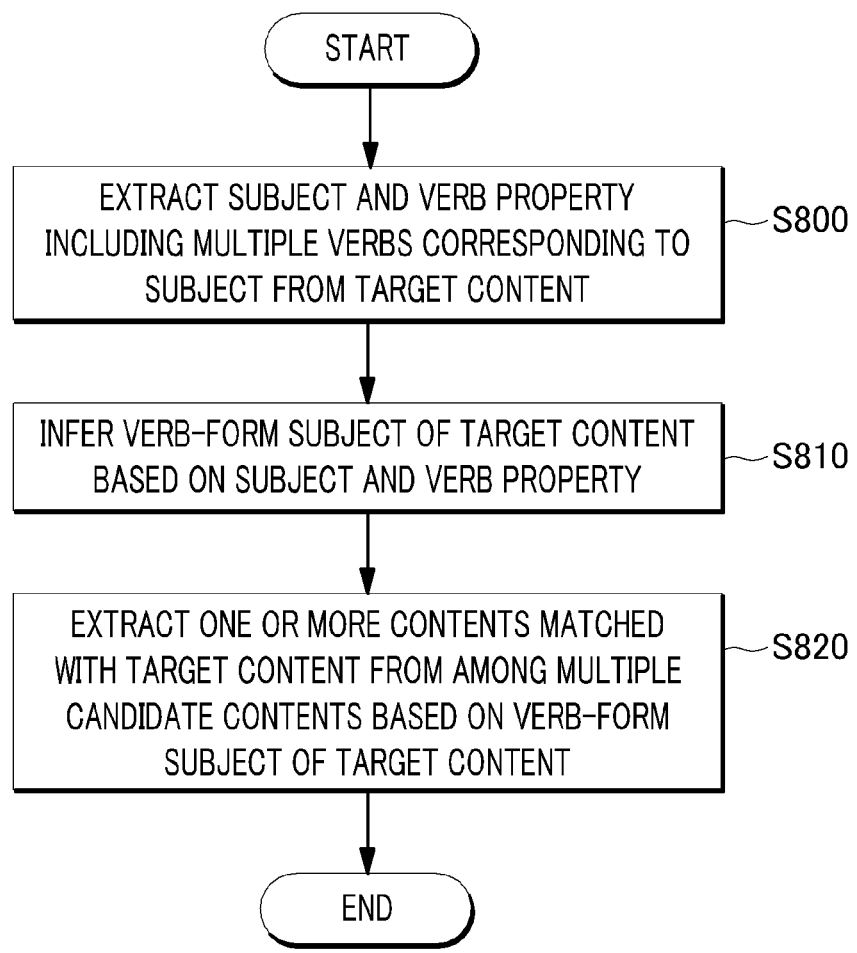

SERVER AND METHOD FOR PROVIDING CONTENT BASED ON CONTEXT INFORMATION

CROSS-REFERENCE TO RELATED APPLICATION

This application claims the benefit under 35 USC 119(a) of Korean Patent Application No. 10-2017-0003097 filed on Jan. 9, 2017, in the Korean Intellectual Property Office, the entire disclosures of which are incorporated herein by reference for all purposes.

STATEMENT REGARDING THIRD PARTY RESEARCH PROJECT

This invention was made with Korean government support under Project No. 1711043662 with 100% contribution sponsored by the Ministry of Science, ICT and Future Planning, Republic of Korea under Research Project Title: "Towards Embedded, Personalized Services based on Tiny Intelligence". The research period runs from Nov. 1, 2016. through Oct. 31, 2017. The beneficiary of said sponsorship is Korea University.

TECHNICAL FIELD

The present disclosure relates to a server and method for providing a content based on context information.

BACKGROUND

A content providing system such as a content searching system or content recommending system automatically selects a content, which a user wants, from among numerous contents and provides the selected content to the user. In this case, the content providing system analyzes explicit information such as history of the user's use of contents, demographic information of the user, and content information of the content selected by the user and then provides the content to the user.

A conventional content providing system has an advantage of being able to quickly provide information which a user wants. However, the conventional content providing system uses only explicit information, and thus has a disadvantage of being unable to reflect the user's needs.

In this regard, Korean Patent No. 10-1536520 (entitled "Method and server for extracting topic and evaluating compatibility of the extracted topic") discloses a method including extracting a noun from a document group according to classification information, calculating a weighting for the noun and extracting a keyword which is a word representing the document group, calculating a weighting for the extracted keyword and generating a cluster by clustering the keyword and relative word, and extracting a topic group in accordance with classification by combining similar clusters of the generated clusters, and a server using the same.

SUMMARY

In view of the foregoing, the present disclosure provides a server and method for providing a content based on context information by extracting one or more contents matched with a content on the basis of a verb-form subject extracted from the content.

However, problems to be solved by the present disclosure are not limited to the above-described problems. There may be other problems to be solved by the present disclosure.

According to a first aspect of the present disclosure, a server for providing a content based on context information includes a memory in which a content providing program is stored, and a processor that executes the program stored in the memory. Herein, upon execution of the program, the processor extracts a subject and a verb property including multiple verbs corresponding to the subject from a target content, infers a verb-form subject of the target content on the basis of the subject and the verb property, and extracts one or more contents matched with the target content from among multiple candidate contents on the basis of the verb-form subject of the target content. Further, the multiple verbs corresponding to the subject are extracted from an associative verb group.

According to a second aspect of the present disclosure, a method for providing a content based on context information by a server for providing a content includes: extracting a subject and a verb property including multiple verbs corresponding to the subject from a target content; inferring a verb-form subject of the target content on the basis of the subject and the verb property; and extracting one or more contents matched with the target content from among multiple candidate contents on the basis of the verb-form subject of the target content. Herein, the multiple verbs corresponding to the subject are extracted from an associative verb group.

According to an exemplary embodiment of the present disclosure, it is possible to extract a customized content for a user on the basis of a subject association and a verb association extracted from a content. Further, according to an exemplary embodiment of the present disclosure, it is possible to consider a syntactic relevance and a semantic relevance as being complementary to each other. Therefore, according to an exemplary embodiment of the present disclosure, it is possible to quickly and accurately provide a content which a user wants.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

FIG. 7 is a flowchart of a method for matching a content based on context information by a content providing server according to an exemplary embodiment of the present disclosure.

DETAILED DESCRIPTION

Figure 1:
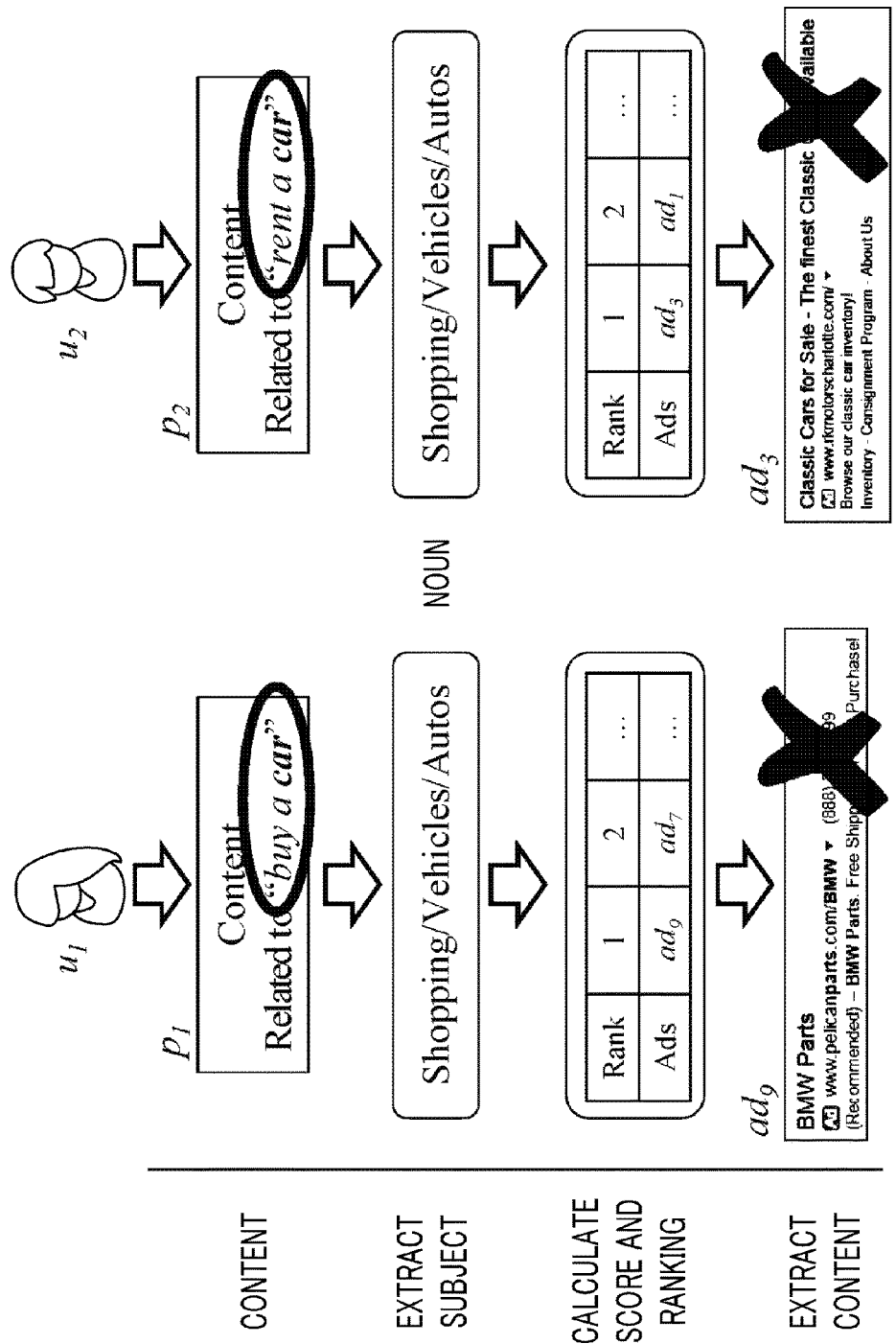
FIG. 1 is an exemplary diagram provided to explain a conventional content providing server.

Hereinafter, embodiments of the present disclosure will be described in detail with reference to the accompanying drawings so that the present disclosure may be readily implemented by those skilled in the art. However, it is to be noted that the present disclosure is not limited to the embodiments but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element. Further, it is to be understood that the term "comprises or includes" and/or "comprising or including" used in the document means that one or more other components, steps, operation and/or existence or addition of elements are not excluded in addition to the described components, steps, operation and/or elements unless context dictates otherwise.

Hereinafter, a conventional content providing server will be described with reference to FIG. 1.

FIG. 1 is an exemplary diagram provided to explain the conventional content providing server.

The conventional content providing server extracts and provides a content associated with a content selected or consumed by a user through a user device. In this case, the consumption may refer to the purchase or use of the content by the user.

Specifically, the conventional content providing server may extract a subject from nouns included in the content consumed by the user. Then, the conventional content providing server may extract an associative content on the basis of the subject and provide the associative content to the user through a user device 260.

For example, referring to FIG. 1, the conventional content providing server extracts a subject from a content p1 including "buy a car" consumed by a first user U1. The conventional content providing server may extract associative subjects including "shopping", "vehicles" and "autos" on the basis of "car" included in the content of the first user. Then, the conventional content providing server may extract a content associated with the content of the first user on the basis of the extracted subjects and provide the associative content to the first user.

Further, the conventional content providing server extracts a subject from a content p2 including "rent a car" consumed by a second user U2. The conventional content providing server may extract associative subjects including "shopping", "vehicles" and "autos" on the basis of "car" included in the content of the second user. Then, the conventional content providing server may extract a content associated with the content of the second user on the basis of the extracted subjects and provide the associative content to the second user.

As such, the conventional content providing server considers only subjects included in a content, but does not consider other factors. Therefore, the conventional content providing server may provide the first user and the second user who have consumed the contents having the same subjects with the same content extracted on the basis of the same subjects.

However, even when the first user and the second user consume the subjects with different intentions as described above with reference to FIG. 1, the conventional content providing server provides a content in consideration of only the subjects, and, thus, only the same content can be provided. That is, the conventional content providing server has limitations in determining a user's intention and providing a customized content suitable for the user's intention.

Hereinafter, a content providing server 210 according to an exemplary embodiment of the present disclosure will be described with reference to FIG. 2 to FIG. 7.

Figure 2:
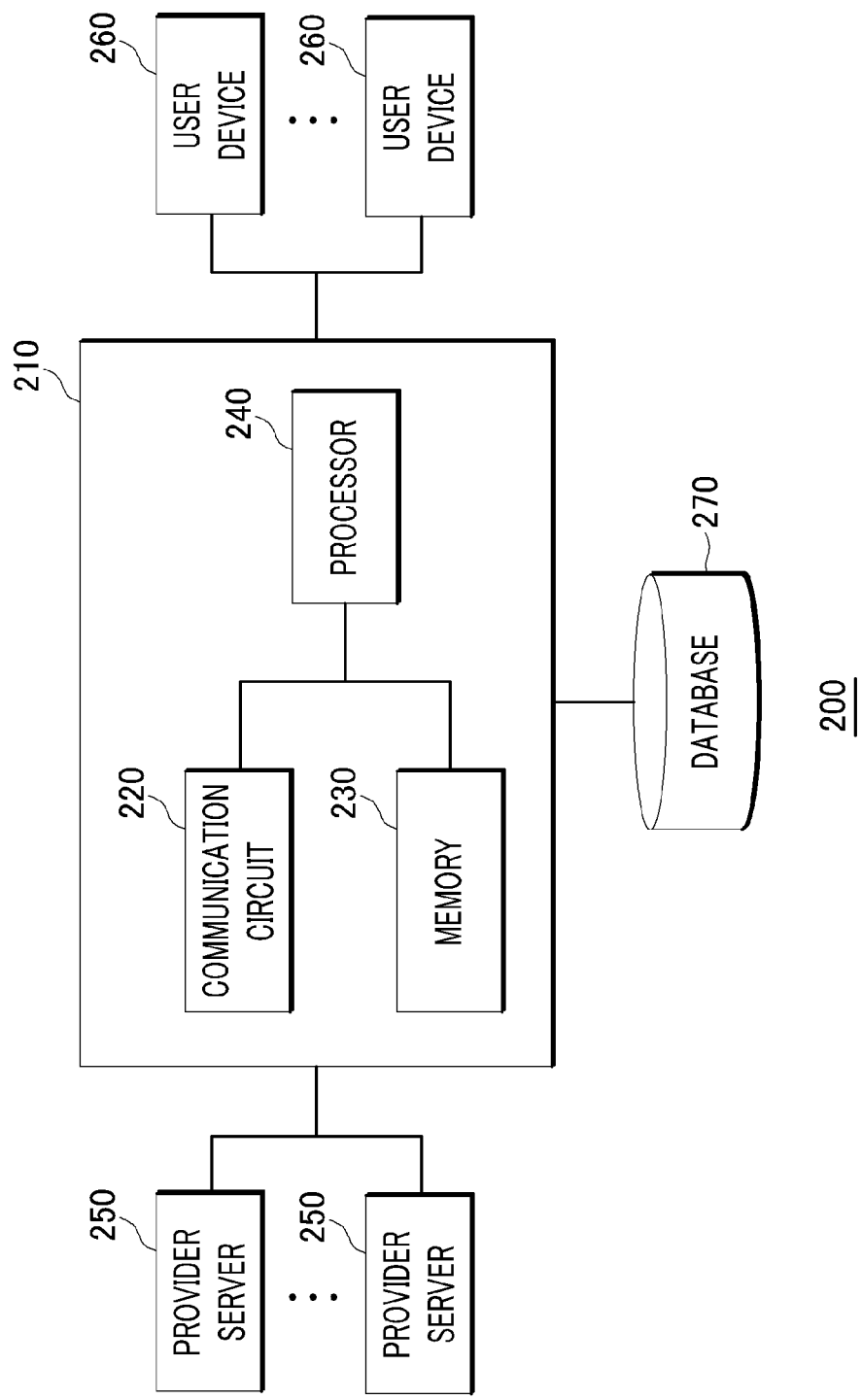
FIG. 2 is a block diagram illustrating a content providing system according to an exemplary embodiment of the present disclosure.

FIG. 2 is a block diagram illustrating a content providing system 200 according to an exemplary embodiment of the present disclosure.

The content providing system 200 according to an exemplary embodiment of the present disclosure extracts context information from a content selected or consumed by a user device 260 through the content providing server 210 and matches a relevant content on the basis of the extracted context information and provides the relevant content to the user device 260. In this case, the content providing system 200 includes the content providing server 210, a provider server 250, the user device 260, and a database 270.

The content providing server 210 extracts context information of a target content 370 selected or consumed by the user device 260. Further, the content providing server 210 extracts one or more contents on the basis of the extracted context information and provides the contents to the user device 260.

The provider server 250 may provide a content to the content providing server 210. In this case, the provider server 250 may generate a content and then provide the content to the content providing server 210. Further, the provider server 250 may collect a content generated by the user device 260 or a provider device and then provide the content to the content providing server 210.

The user device 260 may receive a content selected by itself or a user-customized content from the content providing server 210.

The database 270 may store a content received from the provider server 250. In this case, the database 270 may store the content through a content database 340 configured to store contents. Further, the database 270 may store an associative verb group 350, a subject classification tree 360, and the like used by the content providing server 210 to extract a content.

In this case, the database 270 may be installed in the content providing server 210. For example, the database 270 may be executed as a service included in the content providing server 210. Otherwise, the database 270 may be connected through a communication circuit 220 of the content providing server 210, but is not limited thereto.

The content may include a web page, a multimedia content, or an advertising content which can be used by the user through the user device 260. Further, the content may include a newspaper article, a magazine, and a book which are digitized and can be provided to the user through the user device 260, but is not limited thereto.

In this case, the content may be a text including one or more words or one or more sentences. Otherwise, the content may include a relevant explanation including words or sentences of the content.

Meanwhile, the content providing server 210 includes the communication circuit 220, a memory 230, and a processor 240.

The communication circuit 220 may perform data communication with the user device 260.

The memory 230 stores a content providing program 300 therein. In this case, the memory 230 collectively refers to a non-volatile storage device that retains information stored therein even when power is not supplied and a volatile storage device that requires power to retain information stored therein. Further, the content providing program 300 will be described in detail with reference to FIG. 3.

Figure 3:
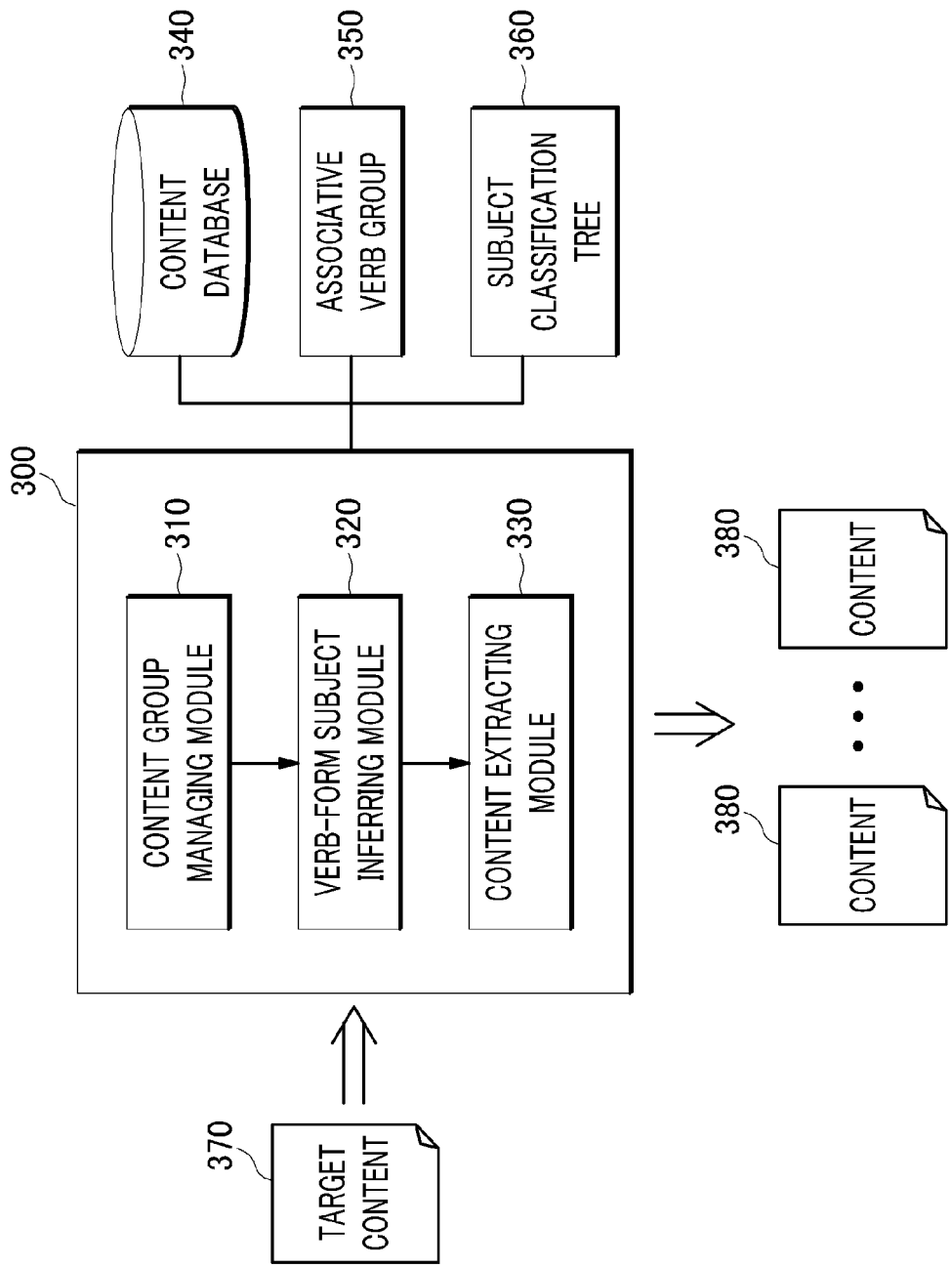
FIG. 3 is a block diagram illustrating a content providing program according to an exemplary embodiment of the present disclosure.

FIG. 3 is a block diagram illustrating the content providing program 300 according to an exemplary embodiment of the present disclosure.

The content providing program 300 may include a content group managing module 310, a verb-form subject inferring module 320, and a content extracting module 330.

The processor 240 may generate an associative verb group 350 through the content group managing module 310. In this case, the associative verb group 350 may be generated using contents collected and stored in the content database 340. The content group managing module 310 may include a content collecting module 410 and an associative verb extracting module 420.

Figure 4:
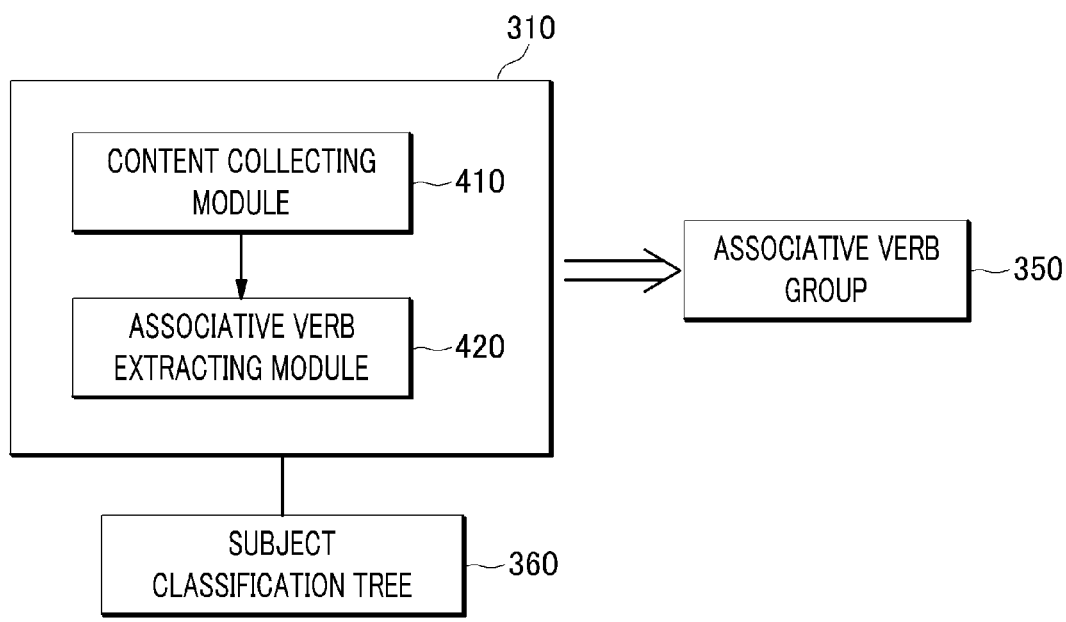
FIG. 4 is a block diagram illustrating a content group managing module according to an exemplary embodiment of the present disclosure.

FIG. 4 is a block diagram illustrating the content group managing module 310 according to an exemplary embodiment of the present disclosure.

The processor 240 may collect multiple contents through the content collecting module 410. Further, the processor 240 may store the collected contents in the content database 340. In this case, the contents may be included in the subject classification tree 360 or may be collected, classified by the subject classification tree 360 and then stored.

The processor 240 may extract the associative verb group 350 using contents which have been previously classified through the subject classification tree 360.

For example, the subject classification tree 360 may be an open directory project. The open directory project is a kind of a text database 270 on the web. The open directory project may subdivide texts such as web documents on the world wide web into categories using hierarchical ontology and classify the texts using a tree data structure.

Further, the subject classification tree 360 may be classified by category in a web search engine or may be collected by the content providing server 210 and then generated, but is not limited thereto.

Further, the processor 240 may extract words which are nouns or verbs from multiple contents corresponding to subjects collected through the associative verb extracting module 420. In this case, the processor 240 may extract words from a content and further extract nouns or verbs from the words using a morpheme analyzer which is included in the associative verb extracting module 420 or connected to the associative verb extracting module 420. For example, the morpheme analyzer may be a Stanford Parser included in a Stanford Natural Language Processing Tool, but is not limited thereto.

Further, the words extracted through the morpheme analyzer may be the roots of corresponding words. For example, the processor 240 may remove the end of a verb extracted using a Porter Stemmer included in the morpheme analyzer to extract the root of the corresponding word. Otherwise, the processor 240 may extract the root of a word or a representing word through a predefined dictionary such as Wordnet and thesaurus.

The processor 240 may generate associative verbs corresponding to the subject on the basis of verbs matched with the subject. In this case, the associative verbs may be extracted on the basis of grammatical relations among words included in a sentence. Further, the associative verbs may include not only words as verbs but also words as gerunds which can be formed using verbs.

For example, the processor 240 may extract a noun extracted from a sentence included in a content and a verb whose direct object is the extracted noun. Further, the processor 240 may extract one or more verbs corresponding to a subject using the extracted noun and verb. In this case, the processor 240 may extract one or more verbs corresponding to the subject on the basis of a dependency tree. The dependency tree is a structure in which relations among words are defined.

Furthermore, the processor 240 may generate the extracted one or more verbs as associative verbs corresponding to the subject. After extracting the subject and the associative verbs corresponding to the subject, the processor 240 may generate the associative verb group 350.

For example, in the case where a sentence "Order Ganocafe healthy coffee from us and save 25% of retail price" is included in a specific content corresponding to a subject "coffee", the processor 240 may extract nouns "coffee" and "price" from the sentience. Further, the processor 240 may extract a verb "order" corresponding to the noun "coffee". The processor 240 may extract a verb "save" corresponding to the noun "price". The processor 240 may generate a pair using a noun and a verb corresponding to the noun. That is, the processor 240 may generate a "<order, coffee>" and "<save, price>".

Further, the processor 240 may extract "order" as a verb associated with "coffee" which is the subject of the content including the sentence. The processor 240 may repeatedly perform the above-described method to other contents included in the subject "coffee". Furthermore, the processor 240 may extract verbs "order", "drink", and "make" associated with "coffee" through this process. Moreover, the processor 240 may match the extracted subject with the multiple associative verbs to generate the associative verb group 350 such as <"coffee", {"order", "drink", "make"}>.

According to the above-described method, the processor 240 may generate associative verbs corresponding to multiple subjects included in the subject classification tree. Further, the processor 240 may match the generated associative verbs with the multiple subjects corresponding thereto, respectively, and then store them in the associative verb group 350.

Meanwhile, the processor 240 may extract a subject and a verb-form subject corresponding to the subject from the target content 370 through the verb-form subject inferring module 320. The verb-form subject inferring module 320 will be described in detail with reference to FIG. 5.

Figure 5:
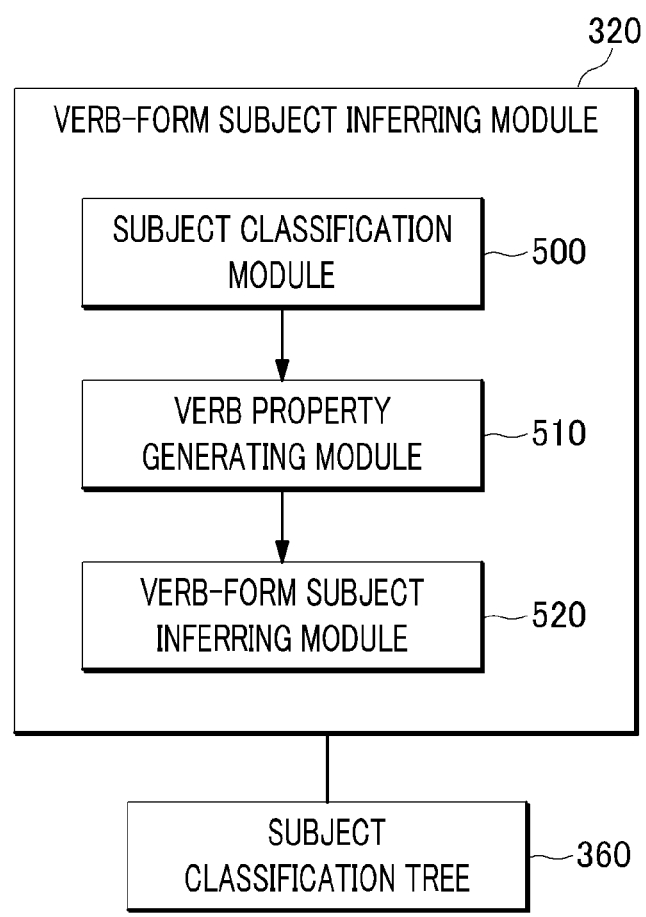
FIG. 5 is a block diagram illustrating a verb-form subject inferring module according to an exemplary embodiment of the present disclosure.

FIG. 5 is a block diagram illustrating the verb-form subject inferring module 320 according to an exemplary embodiment of the present disclosure.

The verb-form subject inferring module 320 may include a subject classification module 500, a verb property generating module 510 and a verb-form subject inferring module 520 as subdivided modules.

The processor 240 may extract a subject from multiple sentences included in the target content 370 through the subject classification module 500. For example, if the target content 370 is included in a node "college" and a node "college life" of the subject classification tree 360, the processor 240 may extract "college" and "college life" as subjects of the target content 370.

In this case, the subjects are calculated on the basis of the subject classification tree 360 and may become a path from a root node of the subject classification tree 360 to a node including the target content 370. For example, if the target content 370 is included in the node "college" of the subject classification tree 360, the processor 240 may extract all of subjects included in a parent node or a grandparent node of the node "college" in the subject classification tree 360. Further, the processor 240 may extract "top/reference/education/college" as subjects of the target content 370 according to a hierarchical structure between the nodes. Likewise, if the target content 370 is included in the node "college life" of the subject classification tree 360, the processor 240 may extract "university/college life" as subjects.

Further, the processor 240 may extract a verb property of the subjects extracted from the target content 370 through the verb property generating module 510.

Specifically, the processor 240 may extract associative verbs associated with the subjects from the associative verb group 350. Further, the processor 240 may extract a verb included in the content from the associative verbs. The processor 240 may generate a vector of the extracted verb to extract a verb property from the target content 370. In this case, the verb property may be an intention of a user who consumes the target content 370 about the subject.

$$\vec{vf}_{p,c} = (w_1, w_2, \ldots w_m) \qquad \text{<Equation 1>}$$

For example, in the case where there is the target content 370 and a subject is extracted from the target content 370, the processor 240 may calculate weightings form number of verbs as shown in Equation 1 and generate a verb property using the weightings. In Equation 1, p represents the target content 370 and c represents a specific subject extracted from the target content 370. Further, $\vec{vf}_{p,c}$ represents a verb property and $w_n$ represents a weighting for a nth verb $v_n$ included in the verb property.

$$w_n = \cos(\vec{p}, \vec{d_n}) \qquad \text{<Equation 2>}$$

For example, a weighting for a specific verb included in a verb property may be calculated on the basis of cosine similarity as shown in Equation 2. Besides, the processor 240 may calculate a weighting using, but not limited to, a Jaccard coefficient, a Dice coefficient, and a Humming distance.

In Equation 2, $\vec{p}$ represents multiple word vectors included in the target content 370 and $d_n$ represents a group of verb documents including semantically expanded contents.

A verb document is generated on the basis of the context of a specific verb. For example, the verb document may include a document about words semantically relevant to the specific verb. Therefore, the processor 240 may generate a verb document by semantically expanding the verb. In this case, the processor 240 may use a predefined dictionary.

For example, the processor 240 may extract a synonym, a definition and an example sentence matched with the verb from Wordnet. Then, the processor 240 may generate a verb document using the extracted synonym, definition and example sentence.

As such, by using a verb document about a verb for which a weighting is to be measured, the processor 240 can calculate a weighting on the basis of semantically relevant words even if the specific verb for which a weighting is to be measured is not included in a target page.

For example, in the case where a specific content "Ramapo College of New Jersey Search for collages online" and subjects "top/reference/education/college" and "university/college life" are present and a verb "apply" associated with the subjects is also present, the specific content does not include an associative verb. However, the processor 240 may use a verb document extracted from the associative verb to calculate a weighting the specific content and the verb "apply".

The processor 240 may generate a verb-form subject of the target content 370 using a subject extracted from the target content 370 and a verb property matched with the subject through the verb-form subject inferring module 520→320.

Meanwhile, after the verb-form subject of the target content 370 is generated, the processor 240 may extract one or more contents matched with the target content 370 from among multiple candidate contents through the content extracting module 330.

In this case, the candidate contents may have been stored in the content database 340. For example, the candidate contents may be contents which have not yet been consumed by the user among multiple contents stored in the content database 340, or may be new contents. Otherwise, the candidate contents may be contents previously set by a manager of the content providing server 210, but are not limited thereto. Further, the candidate contents may be contents from which verb-form subjects are inferred through the process described above with reference to FIG. 5.

Hereinafter, the content extracting module 330 will be described in detail with reference to FIG. 6.

Figure 6:
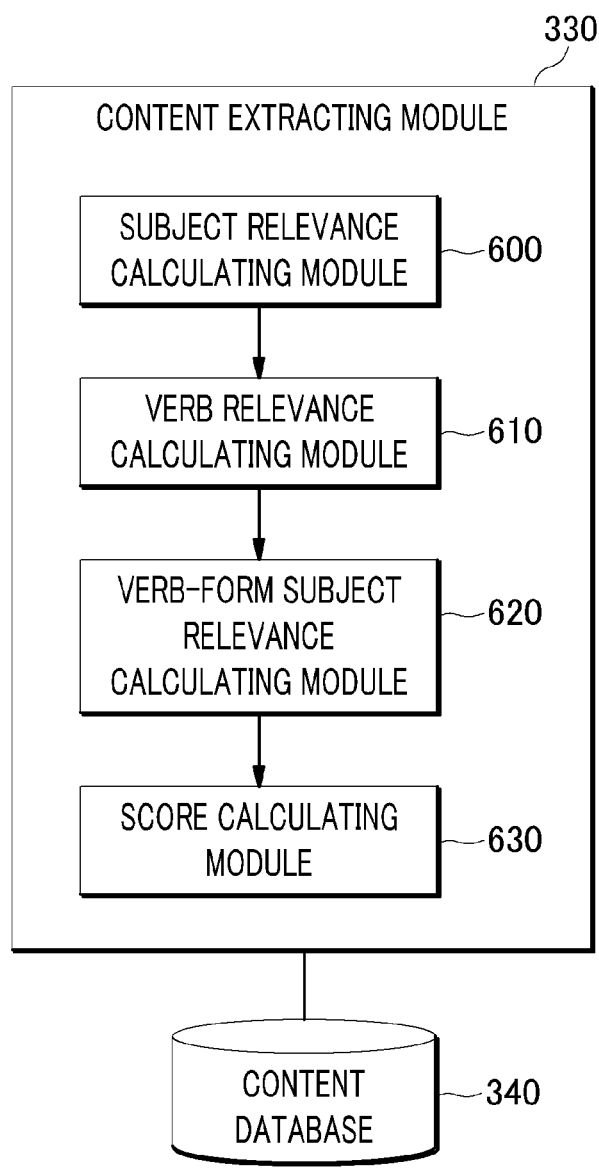
FIG. 6 is a block diagram illustrating a content extracting module according to an exemplary embodiment of the present disclosure.

FIG. 6 is a block diagram illustrating the content extracting module 330 according to an exemplary embodiment of the present disclosure.

The content extracting module 330 may include a subject relevance calculating module 600, a verb relevance calculating module 610, a verb-form subject relevance calculating module 620 and a score calculating module 630 as subdivided modules.

The processor 240 may calculate a subject relevance between the target content 370 and a candidate content through the subject relevance calculating module 600.

For example, the processor 240 may calculate the subject relevance on the basis of Equation 3.

$$relevance_t(p, a) = \sum_{pc \in PC} \sum_{ac \in AC} sim_t(pc, ac) \cdot cw(pc) \cdot cw(ac) \qquad \text{<Equation 3>}$$

In Equation 3, p represents the target content 370 and PC represents a subject group including one or more subjects extracted from the target content 370. Further, a represents a candidate content and AC represents a subject group including one or more subjects extracted from the candidate content.

Furthermore, $sim_t$ represents a function for calculating a relevance between a subject extracted from the target content 370 and a subject extracted from the candidate content. For example, $sim_t$ may be based on a PageRank algorithm or a weighted PageRank algorithm, but is not limited thereto.

Further, cw represents a function for calculating a classification score for each subject. In this case, the classification score may be calculated by a previously generated classifier through the subject classification tree 360. Otherwise, the classification score may be previously set on the basis of each subject included in the subject classification tree 360 and multiple contents corresponding to each subject, but is not limited thereto.

For example, the classification score may be calculated by a classifier generated on the basis of a machine learning algorithm or a classification method. Otherwise, the classification score may be calculated on the basis of TF-IDF (term frequency-inverse document frequency) or the like.

Further, the processor 240 may calculate a verb relevance between the target content 370 and the candidate content through the verb relevance calculating module 610. For example, the processor 240 may calculate the verb relevance between the target content 370 and the candidate content on the basis of Equation 4.

$$relevance_v(p, a) = \sum_{pc \in PC} \sum_{ac \in AC} sim_t(pc, ac) \cdot sim_v(\overrightarrow{vf_{p,pc}}, \overrightarrow{vf_{a,ac}}) \quad \text{<Equation 4>}$$

In Equation 4, $sim_v$ represents a function for calculating a relevance between a verb property of a subject extracted from the target content 370 and a verb property of a subject extracted from the candidate content. For example, $sim_t$ may be cos relevance, but is not limited thereto.

In this case, a verb property is extracted in association with a subject.

For example, in the case where a subject of a first content is "basketball" and a verb is "play" and a subject of a first candidate content is "music" and a verb is "play", the first content and the first candidate content may have a high verb relevance but may have a low subject relevance. Further, in the case where a subject of a second candidate content is "baseball" and a verb is "play", the first content and the second candidate content may have a high verb relevance and a high subject relevance.

Therefore, a verb relevance according to an exemplary embodiment of the present disclosure may reflect a verb relevance in verb associated with a subject and a relevance in subject used for calculating a verb property.

The processor 240 may calculate a verb relevance by reflecting a subject relevance and a verb property relevance on the basis of Equation 4. That is, referring to Equation 4, the processor 240 may multiply the verb relevance by the subject relevance to reflect a subject association of the target content 370 on the verb relevance.

Meanwhile, if the subject relevance and the verb relevance between the target content 370 and the candidate content are calculated, the processor 240 may calculate a verb-form subject relevance between the target content 370 and the candidate content through the verb-form subject relevance calculating module 620. In this case, the processor 240 may calculate the verb-form subject relevance on the basis of Equation 5.

$$relevance(p,a) = relevance_s(p,a) + \beta \cdot relevance_v(p,a) \quad \text{<Equation 5>}$$

In Equation 5, $\beta$ represents a weighting for a verb relevance. In this case, $\beta$ may be a real number between 0 and 1. For example, $\beta$ may be 0.2.

That is, referring to Equation 5, the processor 240 may set a weighting for the subject relevance between target content 370 and the candidate content to 1 and a weighting for the verb subject to a real number which is higher than 0 and lower than 1 to be lower than the weighting for the subject relevance. Therefore, the processor 240 may set a verb-form subject relevance of a candidate content having a high subject relevance to be higher than a verb-form subject relevance of a candidate content having a high verb relevance through Equation 5.

Thus, if there are sufficient candidate contents matched in subject with the target content 370, the processor 240 may give a higher weighting to the subject relevance than to the verb relevance and select a content to be provided to the user device 260 among the candidate contents.

Further, even if there is a small number of candidate contents or there is no candidate content matched in subject with the target content 370, the processor 240 may select a content to be provided to the user device 260 on the basis of the verb relevance.

Meanwhile, the processor 240 may calculate a score for a final candidate content through the score calculating module 630. Further, the processor 240 may select a predetermined number of candidate contents in order of score among multiple candidate contents for which scores are calculated and provide the selected candidate contents to the user device 260.

For example, the processor 240 may calculate a final score by linear combination between a semantic relevance as implicit information and a syntactic relevance as explicit information between the target content 370 and the candidate contents. In this case, the semantic relevance may refer to the above-described verb-form subject relevance.

The score may be calculated through Equation 6.

$$score(p,a) = (1-\alpha) \cdot score_{keyword}(p,a) + \alpha \cdot relevance(p,a) \quad \text{<Equation 6>}$$

In Equation 6, $score_{keyword}$ represents a semantic relevance calculated on the basis of keywords included in the target content and the candidate contents. For example, $score_{keyword}$ may be a score calculated on the basis of TF-IDF.

Further, a represents a relative weighting for a semantic relevance and a syntactic relevance. In this case, a may have a real number of from 0 to 1. For example, a may be 0.8.

Meanwhile, a content according to another exemplary embodiment of the present disclosure may be a multimedia content.

For example, the multimedia content may include a video content, an image content, a photo content, a music content, and a sound content. Further, the multimedia content may include meta information such as explanation, title, subject, creator information, size information, resolution information, and equipment information of the multimedia content.

The processor 240 may extract a subject and a verb property corresponding to the subject from meta information of a target multimedia content selected by the user. The processor 240 may infer a verb-form subject on the basis of the subject and the verb property.

Further, the processor 240 may extract one or more candidate multimedia contents on the basis of a verb-form subject extracted from meta information of multiple candidate multimedia contents and a verb-form subject of the target multimedia content. The processor 240 may provide the extracted one or more candidate multimedia contents to the user through the user device 260.

Hereinafter, a method for matching a content based on context information by the content providing server 210 according to an exemplary embodiment of the present disclosure will be described with reference to FIG. 7.

FIG. 7 is a flowchart of the method for matching a content based on context information by the content providing server 210 according to an exemplary embodiment of the present disclosure.

The content providing server 210 extracts a subject and a verb property including multiple verbs corresponding to the subject from the target content 370 (S800). In this case, the multiple verbs corresponding to the subject are extracted from the associative verb group 350.

Specifically, the content providing server 210 may generate a verb document for each verb corresponding to the subject. In this case, the verb document may include a definition of a verb, a synonym for the verb, and an example sentence for the verb.

Further, the content providing server 210 may calculate a relevance for each verb on the basis of the target content 370 and the verb document for each verb. The content providing server 210 may generate a verb property to include the relevance calculated for each verb.

Further, the content providing server 210 infers a verb-form subject of the target content 370 on the basis of the subject and the verb property (S810).

The content providing server 210 extracts one or more contents matched with the target content 370 from among multiple candidate contents on the basis of the verb-form subject of the target content 370 (S820).

Meanwhile, before extracting the verb property, the content providing server 210 may extract one or more verbs from a content for each subject included in the subject classification tree 360. Further, the content providing server 210 may match each subject with the one or more verbs extracted from each subject to generate the associative verb group 350.

The server 210 and method for providing a content based on context information according to an exemplary embodiment of the present disclosure can extract a customized content for the user on the basis of a subject association and a verb association extracted from a content. Further, the server 210 and method for providing a content based on context information can consider a syntactic relevance and a semantic relevance as being complementary to each other. Therefore, the server 210 and method for providing a content based on context information can quickly and accurately provide a content which the user wants.

An exemplary embodiment of the present disclosure can be embodied in a storage medium including instruction codes executable by a computer such as a program module executed by the computer. Besides, the data structure in accordance with the embodiment of the present disclosure can be stored in the storage medium executable by the computer. A computer-readable medium can be any usable medium which can be accessed by the computer and includes all volatile/non-volatile and removable/non-removable media. Further, the computer-readable medium may include all computer storage and communication media. The computer storage medium includes all volatile/non-volatile and removable/non-removable media embodied by a certain method or technology for storing information such as computer-readable instruction code, a data structure, a program module or other data.

The system and method of the present disclosure has been explained in relation to a specific embodiment, but its components or a part or all of its operations can be embodied by using a computer system having general-purpose hardware architecture or desirably, a digital signal processing system to which an order of priority can be applied.

The above description of the present disclosure is provided for the purpose of illustration, and it would be understood by those skilled in the art that various changes and modifications may be made without changing technical conception and essential features of the present disclosure.

Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

We claim:

1. A server for providing a digital content based on context information, comprising:
    a memory in which a digital content providing program is stored; and
    a processor that executes the program stored in the memory,
    wherein upon execution of the program, the processor extracts one or more verbs from a digital content for each subject included in a subject classification tree, matches the each subject with the one or more verbs extracted from each subject to generate an associative verb group, extracts a subject from a target digital content, extracts one or more verbs corresponding to the extracted subject from the associative verb group, extracts a verb property representing weight values in vector form which are calculated based on similarity between the target digital content and the extracted one or more verbs from the associative verb group,
    infers a verb-form subject of the target digital content on the basis of the extracted subject and the verb property, and
    extracts one or more digital contents matched with the target digital content from among multiple candidate digital contents on the basis of the verb-form subject of the target digital content, and
    wherein the verb property is defined by the following Equation 1:

$$\vec{vf}_{p,c}=(w_1, w_2, \ldots w_m) \qquad \text{<Equation 1>}$$

where p represents the target digital content, c represents the extracted subject from the target digital content, $\vec{vf}_{p,c}$ represents the verb property, $w_1$ represents the weigh value for the first verb included in the verb property, $w_2$ represents the weigh value for the second verb included in the verb property, and $w_m$ represents the weigh value for an mth verb included in the verb property; and
    wherein the verb-form subject is provided in the form of a pair of the extracted subject and the verb property corresponding to the extracted subject.

2. The server for providing a digital content of claim 1, wherein the processor generates a verb document for each of the verbs corresponding to the subject,
    calculates a relevance of each of the verbs on the basis of the target digital content and the verb document for each of the verbs, and generates the verb property to include the relevance calculated for each of the verbs, and
    the verb document includes a definition of the verb, a synonym for the verb, and an example sentence for the verb.

3. The server for providing a digital content of claim 1,
wherein the processor calculates a first relevance for each of the candidate digital contents on the basis of a verb-form subject of each of the candidate digital contents and a verb-form subject of the target digital content, and
extracts one or more candidate digital contents matched with the target digital content on the basis of the first relevance for each of the candidate digital contents.

4. The server for providing a digital content of claim 3,
wherein the processor calculates a second relevance for each of the candidate digital contents on the basis of a subject corresponding to each of the candidate digital contents and a subject corresponding to the target digital content, and
calculates a third relevance for each of the candidate digital contents on the basis of a verb property corresponding to each of the candidate digital contents and a verb property corresponding to the target digital content, and
calculates the first relevance for each of the candidate digital contents on the basis of the second relevance for each of the candidate digital contents and the third relevance for each of the candidate digital contents.

5. The server for providing a digital content of claim 4,
wherein the processor applies a predetermined weighting to the third relevance for each of the candidate digital contents and then combines the second relevance for each of the candidate digital contents with the weighted third relevance for each of the candidate digital contents to calculate the first relevance for each of the candidate digital contents, and
the predetermined weighting is a real number which is higher than 0 and lower than 1.

6. The server for providing a digital content of claim 5,
wherein the first relevance is calculated on the basis of the second relevance, the third relevance, and the following Equation:

relevance($p,a$)=relevance$_t$($p,a$)+β·relevance$_v$($p,a$)     <Equation> wherein p represents the target digital content, a represents a candidate digital content, relevance(p,a) represents the first relevance, relevance$_t$(p,a) represents the second relevance, relevance$_v$(p,a) represents the third relevance, and β represents a predetermined weighting.

7. The server for providing a digital content of claim 3,
wherein the processor calculates a syntactic relevance for each of the candidate digital contents and the target digital content,
calculates a score corresponding to each of the candidate digital contents on the basis of the first relevance for each of the candidate digital contents and the syntactic relevance corresponding to each of the candidate digital contents, and
extracts one or more candidate digital contents matched with the target digital content in order of score.

8. The server for providing a digital content of claim 1,
wherein the target digital content is a web page digital content, and
the candidate digital contents include at least one of a web page digital content, a multimedia digital content, and an advertising digital content.

9. The server for providing a digital content of claim 1,
wherein the target digital content and the candidate digital contents are multimedia digital contents, and
the processor infers a verb-form subject of the target digital content from meta information included in the target digital content to extract one or more candidate digital contents matched with the target digital content.

10. A method for providing a digital content based on context information by a server for providing a digital content, comprising:
extracting one or more verbs from a digital content for each subject included in a subject classification tree;
generating an associative group by matching the each subject with the one or more verbs extracted from each subject;
extracting a subject from a target digital content;
extracting a verb property represents weight values in vector form which are calculated based on similarity between the target digital content and the extracted one or more verbs from the associative verb group;
inferring a verb-form subject of the target digital content on the basis of the extracted subject and the verb property; and
extracting one or more digital contents matched with the target digital content from among multiple candidate digital contents on the basis of the verb-form subject of the target digital content,
wherein the verb property is defined by the following Equation 1:

$$\vec{vf}_{p,c}=(w_1,w_2,\ldots w_m) \qquad <\text{Equation 1}>$$

where p represents the target digital content, c represents the extracted subject from the target digital content, $\vec{vf}_{p,c}$ represents the verb property, $w_1$ represents the weigh value for the first verb included in the verb property, $w_2$ represents the weigh value for the second verb included in the verb property, and $w_m$ represents the weigh value for an mth verb included in the verb property; and
wherein the verb-form subject is provided in the form of a pair of the extracted subject and the verb property corresponding to the extracted subject.

11. The method for providing a digital content of claim 10,
wherein the extracting of a verb property includes:
generating a verb document for each of the verbs corresponding to the subject;
calculating a relevance of each of the verbs on the basis of the target digital content and the verb document for each of the verbs; and
generating the verb property to include the relevance calculated for each of the verbs, and
the verb document includes a definition of the verb, a synonym for the verb, and an example sentence for the verb.

12. A computer-readable storage medium that stores a program configured to perform a method of claim 10 on a computer.

* * * * *